United States Patent Office 2,880,819
Patented Apr. 7, 1959

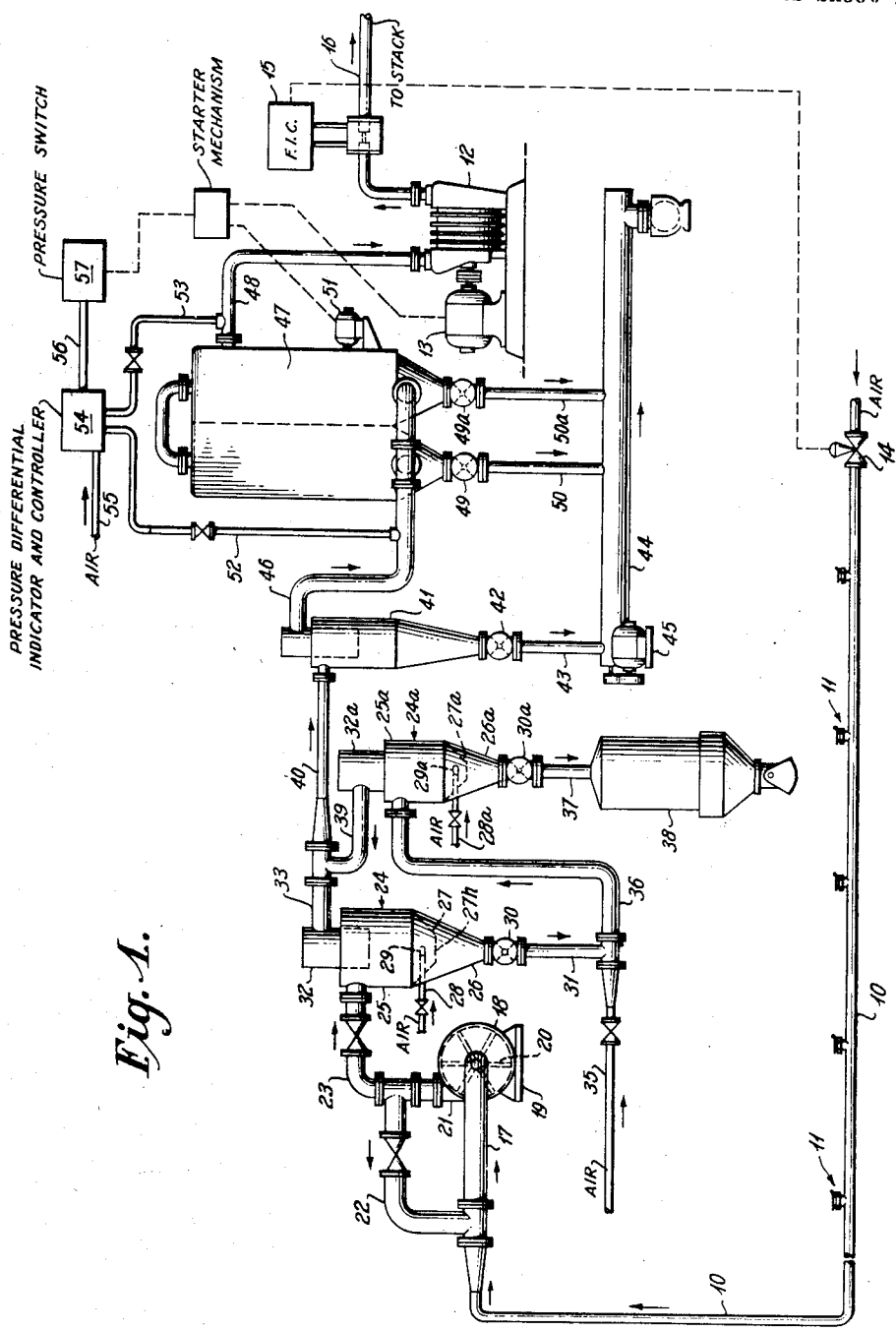

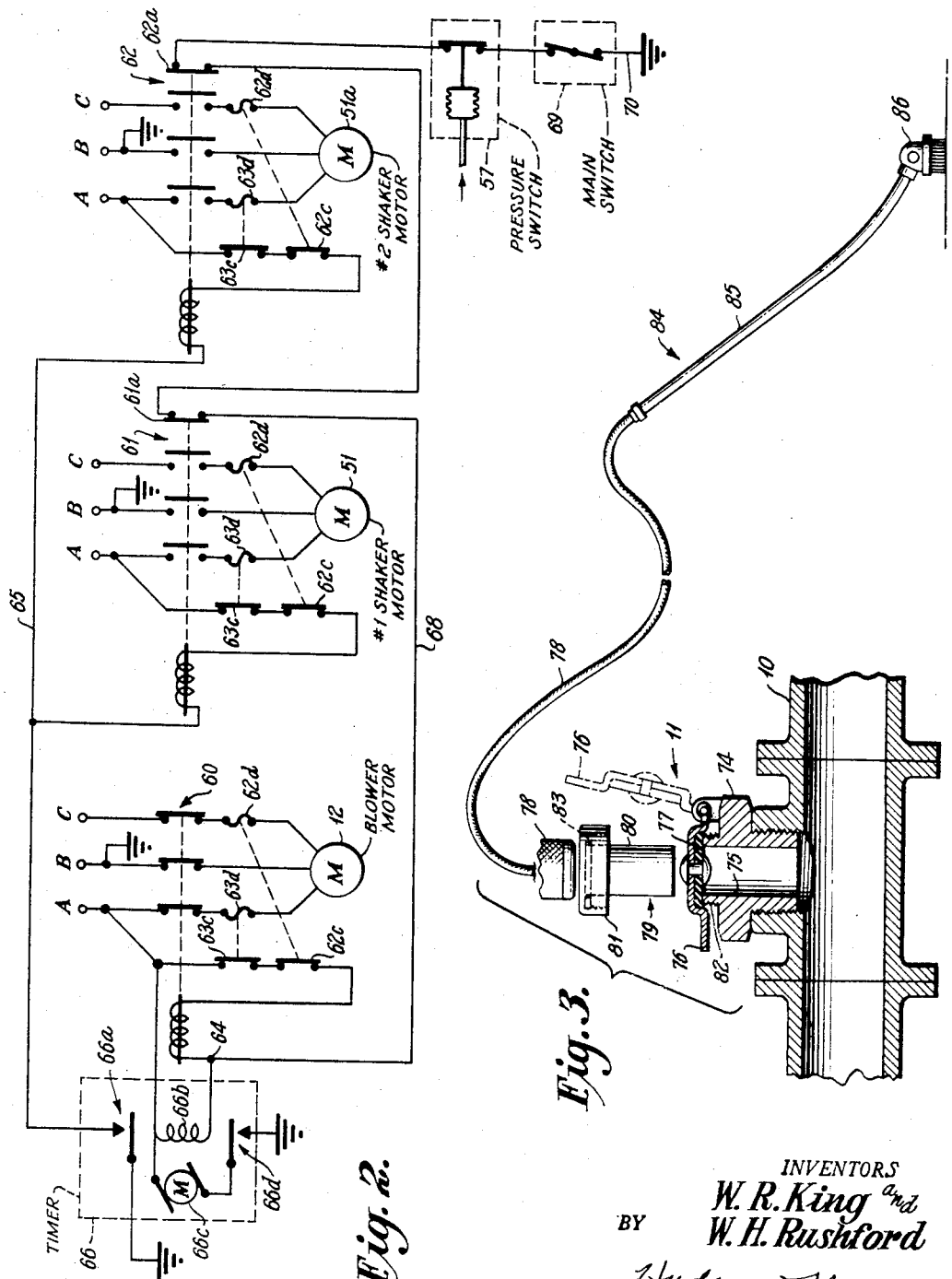

2,880,819

RECOVERY AND CLASSIFICATION OF SOLIDS

William R. King, Bartlesville, Okla., and Wilson H. Rushford, Borger, Tex., assignors to Phillips Petroleum Company, a corporation of Delaware Original application February 16, 1953, Serial No. 337,198, now Patent No. 2,779,468, dated January 29, 1957. Divided and this application August 3, 1955, Serial No. 526,606

(Filed under Rule 147)

7 Claims. (Cl. 183—58)

This application is a division of copending application Serial No. 337,198, filed February 16, 1953, now U. S. Patent 2,779,468, dated Jan. 29, 1957.

This invention relates to a system of classifying particles, particularly particles suspended in a gaseous medium, whereby heavier or larger particles are separated from lighter or smaller ones. In another aspect, it relates to a system for the separation of grit particles from carbon black particles, either as a step in the process of manufacturing carbon black, or as a step in recovering lose black accumulated on the ground or floor in the region of a carbon black plant. In still another aspect, it relates to a system for providing automatic operation of a bag filter to the end that the shaker mechanism of the bag filter is automatically actuated when the pressure differential across the bag filter becomes greater than a predetermined value. In still another aspect, it relates to an improved motor control circuit.

Heretofore, carbon black accumulating on the ground or the floor in the area of a carbon black plant has been largely wasted and, instead of being covered, it has created a dirt problem in neighboring localities. In accordance with this invention, such black is not only picked up or removed from the floor or ground, but is actually converted into a salable product by removal of grit and other heavy particles therefrom. The black recovery system includes a bag filter in which the operation of the shaker motors is automatically controlled in a novel manner.

Although the invention is described herein as being applicable to such a system for the recovery of loose or spilled carbon black, the classification procedures and steps described herein have general utility, for example, in the separation of grit from carbon black in production streams, and in the classification of solids in other types of operations.

It is an object of the invention to provide an improved system for recovering lose carbon black collected on the floor or ground in the region of a carbon black storage or producing plant.

It is a further object to provide novel classification steps and apparatus for the separation of materials of varying densities, particularly when such materials are suspended in a gaseous medium.

It is a still further object to provide a circuit and system whereby a bag filter utilized to separate residual solids from a gaseous stream is automatically controlled so as to remove accumulation of material from the filters when the pressure differential in the bag filter exceeds a predetermined value.

It is a still further object to provide an improved motor control circuit.

Various other objects, advantages and features of the invention will become apparent from the following detailed description taken in conjunction with the accompanying drawings, in which:

Figure 1 is a flow diagram of a carbon black recovery system constructed in accordance with this invention;

Figure 2 is a schematic circuit diagram of a system for controlling the bag filter; and Figure 3 is a vertical sectional view, partially in elevation, of one of the collecting units.

Referring now to Figure 1, we have shown a carbon black collecting conduit 10 which extends through the region of the plant from which the carbon black is to be collected, this conduit having a plurality of fittings 11 spaced therealong which are adapted to receive a hose connection of the type illustrated in Figure 3, and described in detail hereinafter by which the black is removed from the floor or ground, the action being much the same as an ordinary vacuum cleaner. A blower 12 driven by a motor 13 draws air through the system, as will become evident, to provide suction in the conduit 10 permitting the carbon black to be drawn into the conduit through the hose attachment. Air is admitted to the conduit 10 under the control of a valve 14 which is automatically actuated by a flow indicating controller 15 in the outlet conduit 16 of the system so as to maintain a predetermined rate of flow of air through the system.

It will be understood that substantial quantities of loose and pelleted carbon black are discarded in the ordinary operation of a carbon black plant, for example, due to spillage of the black in the region of loose black conveyors and pellet mills. In order that this material may be recovered and reprocessed, nearly all foreign material, herein generically termed grit, must be removed from the black before it is reprocessed. In carbon black production, the term "grit" is taken to mean hard or cinder-like particles of greater than a predetermined size, usually 80 mesh, resulting from abrasion of steel vessels or pipes, or refractory materials in the reactors. Where the carbon black is spilled, the grit may include materials such as sand or rock, or even small metallic particles.

As the material passes through the conduit 10, it will be understood that the black particles and grit particles are suspended in the air passing through the conduit, which constitutes a gaseous suspending medium. The air stream containing the suspended particles is introduced into an inlet 17 formed upon the housing 18 of a blower 19 which is equipped with rotatable blades 20. As the black passes through the housing 18, it is subjected to a hammering action by the blades 20 with the result that any pellets or large pieces of black are pulverized, and the particles leaving the housing 18 through an outlet 21 communicating therewith are of more uniform and smaller size. For best results, the blower should be operated at a relatively slow speed, for example, 2000 revolutions per minute.

In order to secure a more uniform particle size, we have found it advantageous to recycle a portion of the pulverized material through a valved line 22 from outlet conduit 21 to inlet conduit 17, the remainder of the material passing through a valved conduit 23 to the separation system. Preferably and advantageously, about three-fourths of the material leaving the blower is recycled in this manner, although the recycle rate can vary within rather wide limits and, in some cases, it is possible to operate without recycling any material.

The pulverized grit and carbon black particles suspended in air, hereafter termed carrier air, pass through the conduit 23 to an enlarged separating or classification vessel 24. This vessel includes an enlarged cylindrical upper section 25 and a frusto-conical lower section 26. A frusto-conical plate 27 protrudes downwardly into the lower section 26, this plate being perforated by a central opening 27h. An air pipe 28 has a tangential inlet 29 disposed in lower section 26 between the plate 27 and outer wall of the lower section 26 so that the air flows into the annular space between plate 27 and housing section 26, and then flows upwardly through opening 27h to upper section 25.

In the separator 24, the heavy grit particles preferentially settle to the bottom and are removed through a star valve 30 and a pipe 31 while the lighter carbon black particles pass upwardly and are removed through a duct 32 and an outlet line 33 at the top of the vessel 24. For a given size of settling chamber, we have found that the air, hereinafter termed elutriation air, admitted through line 28 can be readily regulated so that heavy particles or particles of greater than a predetermined size (for example, 80 mesh) have a settling velocity greater than the upward velocity of the elutriation air stream. We have also found that, for a given ratio of carrier air to elutriation air, a definite percentage of black settles out downwardly with the grit while this ratio has no apparent effect upon the grit content of the recovered black. That is, the defined air ratio controls the amount of black lost with the grit stream, but has little effect upon the character of the recovered product. The particle size of the material settling to the bottom can be regulated by varying the pressure drop across the vessel in any suitable manner, for example, by changing the size of outlet duct 32.

One series of tests was made wherein cylindrical section 25 had a diameter of 24 inches with a 6 inch radial entry port for inlet 23 and a 12 inch outlet duct 32 communicating with line 33. It was found that the radial inlet substantially reduced the amount of black passing out at the bottom of the unit with the grit, as compared with the amount of black lost utilizing a tangential inlet port. This is probably due to the fact that appreciable amounts of black are lost as a result of the agglomeration effect caused by high speed rotation of the air stream in the separator vessel when a tangential port is used.

The perforated plate 27 provides an improved separation action in that black and grit particles settle out on the plate, and the smaller and lighter black particles are re-entrained by the elutriation air stream so that they are carried upwardly through the outlet duct 32 rather than eventually falling downwardly and being removed with the grit through outlet conduit 31. It was found that little difference in operation was produced by changing the elutriation air port from a tangential port to a radial port. It was also found that the black loss with the grit could be reduced by approximately ten percent when the bottom of the outlet duct 32 extended to the level of the center line of the radial entry or slightly below it, for example four inches or less, rather than nine inches or more below it. Positioning of the outlet duct in this manner had little or no effect upon the grit content of the black product.

In a typical operation, the air ratio, that is the ratio of carrier air to elutriation air, was varied from about 2 to 21, with a feed rate of six pounds of black per minute, and an elutriation air rate of 85 cubic feet per minute. In all cases, the grit content of the black removed was less than 0.01 percent, and over 99.9 percent of the grit initially present was removed. However, with an air ratio of 2.33, 20 percent of the black feed to the separator was removed with the grit while, with an air ratio of 21, about 35 percent of the black was removed with the grit, the amount of black lost being inversely proportional to the air ratio. In general, we have found that the amount of grit in the carbon black product is not substantially affected by the amount of grit present in the feed, large changes in air ratio or variations in other operating conditions.

It will be understood, therefore, that the carbon black leaving the separator through conduit 32 has approximately 99.9 percent of the grit removed therefrom, the grit content being of the order of 0.008 percent or less with an average of slightly more than 0.005 percent. However, even with an air ratio of 2, approximately 20 percent of the black fed to the separation zone is removed downwardly through line 31 along with the grit.

In accordance with the invention, a major portion of this material is recovered by suspending the grit particles along with some carbon black passing downwardly through conduit 31 in a stream of air fed through a valved line 35. The air stream containing suspended carbon black and grit particles passes through a conduit 36 to a second separator 24a of similar construction to the separator 24, corresponding parts being indicated by like reference numerals followed by the letter "a," the separator generally being operated under the same conditions as separator 24. In separator 24a, the grit particles settle to the bottom of the vessel together with a small amount of black and are removed through star valve 30a, a conduit 37 and a hopper 38, from which the grit can be periodically discarded. The carbon black particles suspended in air pass through an outlet 39 to a conduit 40 wherein they are combined with the carbon black recovered in separator 24. In this manner, the total amount of carbon black lost with the grit can be reduced to 5 percent or lower, the use of the second grit separator 24a producing about a 15 percent increase in black recovery.

The combined streams of carbon black suspended in air pass through conduit 40, and enter a cyclone separator 41 wherein the bulk of the carbon black settles downwardly and is removed through a star valve 42 and a conduit 43 communicating with a screw conveyor 44 driven by a motor 45. The conveyor 44 can pass the black to a portion of the production plant upstream of the micropulverizer, where the grit content can be further reduced. Of course, the recovered black can be passed to other disposal as desired by the conveyor 44.

Residual amounts of carbon black leave the separator 41 with the air stream, and this material passes through a conduit 46 to a bag filter 47. The filter has a gas discharge conduit 48 communicating with the suction of blower 12, and a pair of star valves 49, 49a through which the black recovered from the gaseous stream is discharged through conduits 50 and 50a, respectively to the conveyor 44. Bag filter 47 is also equipped with a pair of shaker motors, one of which is indicated by reference numeral 51, the function of these motors being, as is well understood, to vibrate the frame of the bag filter and cause the loose black accumulated upon the filter cloth to be released and fall downwardly through the star valves to the conveyor 44.

In accordance with this invention, the blower 12 operates continuously until sufficient black is accumulated upon the filter cloth of unit 47 to increase the pressure differential across the filter to greater than a predetermined value. At this time, operation of the blower 12 is terminated for a timed period, and the shaker motors are operated during this period to free the filter cloth of the accumulated black. At the end of the timed period, operation of blower 12 is resumed and, if the pressure differential is now below the predetermined value, normal operation continues. However, if the pressure differential is still too high, another cycle of operation of the shaker motors is initiated.

To this end, pressure taps are provided upon the inlet conduit 46 and outlet conduit 48 of the bag filter, these taps communicating through valved lines 52 and 53, respectively, with a pressure differential indicator and controller 54 supplied with air through a line 55. An air line 56 from controller 54 leads to a pressure switch 57 which is connected in an electrical circuit in the manner shown by Figure 2.

In this figure, the blower motor, referred to hereinafter as the first motor, is indicated by reference numeral 12, one shaker motor is indicated by reference numeral 51 and the other shaker motor is indicated by reference numeral 51a. The shaker motors are referred to hereinafter as the second motors. Preferably, the motors are of the three phase type, and each motor is connected by main conductors and main contactor relays 60, 61, and 62, respectively, to a polyphase alternating current source represented by terminals A, B, and C, the terminals B being grounded. The respective coils of each of the contactor relays 60, 61 and 62 have one terminal thereof connected to contact A through two normally closed contact sets 62c and 63c of suitable thermal overload relays. The respective thermal elements 62d and 63d of the overload relays are connected in series with the supply lines of the respective motors leading to contacts A and C to the end that the contactor relay circuit is broken when an overload condition exists for greater than a predetermined time interval, as determined by the thermal integrating characteristics of the overload relays.

The coil of contactor relay 60 has its other terminal connected to a junction 64, while the coils of the contactor relays 61 and 62 have their other terminals connected to a common conductor 65 which, in turn, is connected to ground through a normally closed contact set 66a of a timer 66. Junction 64 is connected through a timer coil 66b to terminal A, the coil 66b operating contact set 66a and 66d, and the timer motor 66c has one terminal thereof connected to terminal A, the other timer motor terminal being connected to ground through a set 66d of normally closed timer contacts.

Junction 64 is also connected in circuit by a lead 68 with a normally closed contact set 61a of contactor relay 61, a normally closed contact set 62a of contactor relay 62, the contacts of pressure switch 57, a main switch 69 and ground at 70.

In operation, assuming that the blower motor is in operation and that no excessive pressure differential exists across the bag filter, the contacts of pressure switch 57 are closed and main switch 69 is closed with the result that a circuit is completed through the energizing coil of contactor relay 60 through contact sets 62a, 61a, the coil of the contactor relay 60 and its associated overload relay contacts 62 and 63 to terminal A, thus closing contactor relay 60 and effecting operation of blower motor 12. A parallel circuit is also completed through timer coil 66b with the result that contacts 66a, 66d are open. Accordingly, the circuits to the energizing coils of contactor relays 61 and 62 are open at contact set 66a while the circuit to the timer motor is open at contact set 66d. When the pressure differential across the bag filter builds up to greater than a predetermined value, pressure switch 57 is opened with the result that the circuit of contactor relay 60 is broken as is the circuit to coil 66b. As a result, contactor relay 60 opens, thereby stopping the blower motor 12, and coil 66b is deenergized, thereby closing contact sets 66a and 66d. Elements 61a, 62a, 66a and 66d are referred to hereinafter as normally closed contact sets.

Thereupon, the circuit to the operating coils of contactor relays 61 and 62 is closed through contact set 66a and operation of the shaker motors is initiated, it being noted that energization of these relays opens contact sets 61a and 62a. The timer motor is energized by contact set 66d and a timing cycle is thereby initiated during which the shaker motors are operative.

When blower motor 12 stops, the pressure across the bag filter is, of course, immediately reduced so that pressure switch 57 again closes. However, the circuit to the coil of contactor relay 60 and timer coil 66b is now broken at contacts 61a and 62a so that the described closure of the pressure switch does not cause the blower motor to start operating. At the end of the timed period, timer 66 is reset with the result that contacts 66a and 66d are momentarily opened.

Thereupon, contactor relays 61 and 62 are deenergized with the result that the shaker motors 51 and 51a stop operating, and the circuit to the coil of contactor relay 60 and timer coil 66b is closed through closure of contact sets 61a and 62a. The energization of coil 66b maintains contact sets 66a and 66d in open position and the energization of the coil of contactor relay 60 causes the blower motor 12 to again operate.

If sufficient carbon black has been removed from the filter cloth by operation of the shaker motors, pressure switch 57 remains closed and operation of the blower continues in the normal manner. However, if the pressure differential is still greater than a predetermined value, the pressure switch is again opened when blower 12 reaches full operating speed so that another cycle of operation of the shaker motors is initiated.

It will be evident, therefore, that the circuit of Figure 2 provides for cessation of blower operation and a timed period of shaker motor operation, this cycle occurring automatically whenever the pressure differential across the bag filter becomes excessive.

In Figure 3, we have shown a typical installation for connecting a hose and pick up device to the conduit 10 through which the carbon black containing suspended grit passes into the system. It will be noted that each fitting 11, as illustrated in Figure 3 comprises a seat 74 having a tapered inner surface 75, the seat normally being closed by a pivoted cap 76 incorporating a sealing gasket 77. A rubber hose 78 is provided with a fitting 79 including a tapered portion 80 adapted to fit within and tightly engage the tapered portion 75 of seat 74 together with an internally threaded flange 81 which cooperates with a complementary screw threaded portion 82 protruding from the seat 74, a gasket 83 being provided within the section 81. The end of hose 78 remote from the fitting is secured to a pick up device 84 which may include a section 85 of pipe connected to a brush, nozzle or other suitable pick up device 86.

As previously stated, operation of the blower motor causes a stream of air to pass through the system from valve 14 through the blower 18, separators 24, 24a and 41, bag filter 47 and outlet conduits 48 and 16. This produces a suction at each of the fittings 11 and, when a pick up device is attached to one or more of these fittings, as illustrated in Figure 3, a suction is created so that carbon black particles are picked up from the floor or ground by the nozzle device 86 and transferred through the conduit 10 to the blower 19. The suspended particles are pulverized in the blower, and the grit is separated from the carbon black particles in separator 24, a major portion of the carbon black settling downwardly with the grit being recovered in secondary separating vessel 24a. The recovered black passes through cyclone separator 41, from which the major portion of the grit free black is fed to conveyor 44, the residual black entrained in the air being recovered in the bag filter 47. The bag filter is provided with a system, as described, for automatic operation of the shaker motors when the pressure differential across it exceeds a predetermined value. In this manner, black spilled upon the ground or floor is recovered and converted into a useful product by the removal of the grit.

It will be apparent, however, that many features of the invention have independent utility for other purposes than the collection of spilled black. For example, the grit removal system can be used in conjunction with normal carbon black manufacturing operations where the grit content of the manufactured black must be reduced to meet product specifications. Further, the classification system is useful in processes other than the manufacture of carbon black where a separation or classification must be effected between particles of different size or density, particularly when such particles are suspended in a gaseous medium. Finally, the electrical circuits controlling the automatic operation of the shaker motor have independent utility in operations other than the separation of residual amounts of carbon black from a gaseous stream.

In some cases, line 36, which can be a line of relatively small diameter, becomes clogged when air circulation through the system is stopped during a period of shaker motor operation. If this occurs, the motor of star valve 30, Figure 1, which has a starter system of the type illustrated in connection with motor 12, Figure 2, can have the associated operating coil connected in parallel with the operating coil of blower motor 12. As a result, when the blower stops, star valve 30 stops, and the material in vessel 24 cannot settle into conduits 31, 36 and clog them. Also the operating coils associated with star valves 49, 49a, the motors of which also have starters of the type illustrated in Figure 2, can be connected in parallel with the operating coil of one of the shaker motors 51 or 51a. Thus, star valves 49, 49a are only actuated during the period when loose black is being shaken from the bags of filter 47 by action of the shaker motors. This saves electricity, and minimizes leakage of gas from conduit 44 into the bag filter 47.

Herein and in the claims the variable pressure differential to a certain value of which the shaker motor 51 is responsive by means of pressure switch 57 and associated circuitry, is termed a "variable" or a "parameter."

While the invention has been described in connection with a present, preferred embodiment thereof, it is to be understood that this description is illustrative only and is not intended to limit the invention.

We claim:

1. In a system for collecting carbon black incorporating a bag filter having an inlet line and an outlet line, a shaker motor mechanically connected to said bag filter, a blower in said outlet line, and a motor driving said blower, in combination, means for sensing the pressure differential between said inlet and outlet line, a pressure switch actuatable in response to a pressure differential of greater than a predetermined magnitude, a timer responsive to actuation of said pressure switch to initiate a timing cycle, such actuation of the pressure switch deenergizing the blower motor, means controlled by said timer to energize said shaker motor during said timing cycle, means disabling said pressure switch during said timing cycle, and means operatively connecting said pressure switch to said blower motor and said timer at the end of said timing cycle.

2. A system in accordance with claim 1 in which there is a second shaker motor mechanically connected to said bag filter, said second shaker motor being actuatable by said means controlled by said timer.

3. In a system for collecting carbon black incorporating a bag filter having an inlet line and an outlet line, an electric shaker motor mechanically connected to said bag filter, a contactor relay actuatable to connect said shaker motor to a current source, a blower in said outlet line, an electric motor driving said blower, a second contactor relay actuatable to connect said blower motor to a current source, means for sensing the pressure differential between said inlet line and outlet line, a pressure switch controlled by said sensing means and actuatable in response to a pressure differential of greater than a predetermined magnitude, means connecting said pressure switch in circuit with a normally closed set of contacts on said shaker motor contactor relay, and the energizing winding of said blower motor contactor relay, a timer having a normally closed contact set connected in circuit with the operating winding of said shaker motor contactor relay, a timer motor connected in circuit with a second normally closed contact set on said timer, a timer coil disposed to open said normally closed contact sets, and leads connecting said timer coil in parallel with the operating winding of said blower motor contactor relay.

4. In a system wherein a first device operates continuously until a parameter of the system reaches a predetermined value, whereupon a second device operates for a timed period to reduce the magnitude of said parameter and the operation of said first device is interrupted during said timed period, in combination, a first electric motor connected to said first device, a first contactor relay actuatable to connect said first motor in circuit with a current source, a second electric motor connected to said second device, a second contactor relay actuatable to connect said second motor in circuit with a current source, a third device for sensing the value of said parameter, a switch actuated by said third device, means connecting said switch in circuit with the operating winding of said first relay and a first contact set on said second relay which is closed when said second relay is not actuated, a timer having a second contact set connecting the operating winding of said second relay in circuit with a current source, a timer motor, a third contact set connected in circuit with said timer motor and a current source, a timer coil to open said second and third contact sets when energized, and means connecting said timer coil in parallel with the operating winding of said first relay.

5. In a system comprising a conduit means for transporting a fluid from one point to another, a restriction to fluid flow in said conduit means, and means for determining the pressure drop across said restriction, in combination, a motor control system responsive to the magnitude of said pressure drop comprising: a first motor, a device operated thereby for transporting said fluid, a second motor operable alternately with said first motor, mechanism connected to said second motor to remove impediments in the path of said fluid, a pressure switch actuatable in response to a pressure differential of greater than a predetermined magnitude, a timer responsive to actuation of said pressure switch to initiate a timing cycle, such actuation of the pressure switch deenergizing the first motor, means controlled by said timer to energize said second motor during said timing cycle, means disabling said pressure switch during said timing cycle, and means operatively connecting said pressure switch to said first motor and said timer at the end of said timing cycle.

6. The system of claim 5 wherein the means operatively connecting said pressure switch to said first motor and timer include a timer coil, a contactor relay connecting said first motor to a current source, leads connecting said timer coil in parallel with the operating winding of said contactor relay, and a line connecting said pressure switch to said leads.

7. In a system comprising a conduit means for transporting a fluid from one point to another, a restriction to fluid flow in said conduit means, means for determining the pressure drop across said restriction, and a first and second motor functioning in response to said pressure drop, in combination, a device operated by said first motor to transport said fluid, mechanism connected to said second motor to remove impediments in the path of said fluid, means for operating said motors alternately in response to the magnitude of said pressure drop comprising: a contactor relay actuatable to connect said first motor to a current source, a second contactor relay actuatable to connect said second motor to a current source, a pressure switch controlled by said pressure drop determining means and actuatable in response to a pressure differential of greater than a predetermined magnitude, a circuit connecting said pressure switch with a normally closed set of contacts on the first motor contactor relay and with the energizing winding of the second motor contactor relay, a timer having a normally closed contact set connected in circuit with the operating winding of said first motor contactor relay, a timer motor connected in circuit with a second normally closed contact set on said timer, a timer coil disposed to open said normally closed contact sets, and leads connecting said timer coil in parallel with the operating winding of said first motor contactor relay.

References Cited in the file of this patent

UNITED STATES PATENTS

| | | |
|---|---|---|
| 1,715,273 | Billings | May 28, 1929 |
| 2,318,395 | Hornbrook | May 4, 1943 |
| 2,626,012 | Persons | Jan. 20, 1953 |
| 2,633,206 | Bruckner | Mar. 31, 1953 |
| 2,779,468 | King et al. | Jan. 29, 1957 |

FOREIGN PATENTS

| | | |
|---|---|---|
| 368,731 | Great Britain | Mar. 1, 1932 |